(12) United States Patent
    Janson et al.

(10) Patent No.: US 10,744,865 B2
(45) Date of Patent: Aug. 18, 2020

(54) HYBRID TRANSAXLE

(71) Applicant: Ford Global Technologies, LLC, Dearborn, MI (US)

(72) Inventors: David Allen Janson, Plymouth, MI (US); Jeffrey Edward Maurer, Commerce, MI (US); David Gon Oh, Ann Arbor, MI (US); Bruce Granstrom, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 16/155,317

(22) Filed: Oct. 9, 2018

(65) Prior Publication Data

US 2020/0108708 A1    Apr. 9, 2020

(51) Int. Cl.
    *B60K 6/40*      (2007.10)
    *B60K 6/365*     (2007.10)
    *F16H 63/34*     (2006.01)
    *F16H 37/08*     (2006.01)
    *F16H 3/72*      (2006.01)

(52) U.S. Cl.
    CPC ............... *B60K 6/365* (2013.01); *B60K 6/40* (2013.01); *F16H 3/724* (2013.01); *F16H 3/727* (2013.01); *F16H 37/0806* (2013.01); *F16H 63/3416* (2013.01); *B60Y 2200/92* (2013.01)

(58) Field of Classification Search
    CPC ...... F16H 3/724; F16H 3/727; F16H 37/0806; B60K 6/365; B60K 6/40
    USPC ..................................... 475/5, 204
    See application file for complete search history.

(56) References Cited

U.S. PATENT DOCUMENTS

| | | | |
|---|---|---|---|
| 5,558,595 A | 9/1996 | Schmidt et al. | |
| 5,643,119 A * | 7/1997 | Yamaguchi | B60K 6/26 180/65.235 |
| 6,371,882 B1 | 4/2002 | Casey et al. | |
| 6,429,541 B2 | 8/2002 | Takenaka et al. | |
| 7,033,296 B2 * | 4/2006 | Takenaka | B60K 6/26 475/5 |
| 7,686,723 B2 | 3/2010 | Schondorf | |
| 8,870,697 B2 * | 10/2014 | Sada | B60K 6/40 475/149 |
| 9,481,235 B1 * | 11/2016 | Banshoya | F16H 3/728 |
| 9,840,140 B1 * | 12/2017 | Holmes | B60K 6/387 |
| 2001/0006919 A1 * | 7/2001 | Takenaka | B60K 6/36 475/5 |
| 2010/0261565 A1 | 10/2010 | Ai et al. | |
| 2010/0320017 A1 | 12/2010 | Besnard et al. | |
| 2011/0042155 A1 * | 2/2011 | Tarasinski | B60L 50/16 180/65.6 |
| 2012/0329594 A1 * | 12/2012 | Sada | B60K 6/40 475/5 |

(Continued)

FOREIGN PATENT DOCUMENTS

KR     100756724 B1 *  9/2007   ............. F16H 3/727

*Primary Examiner* — Roger L Pang
(74) *Attorney, Agent, or Firm* — David Kelley; Brooks Kushman P.C.

(57) ABSTRACT

A hybrid transaxle permits location of a traction motor in a more favorable location, decreasing the risk of occupant injury in a vehicle collision. Axis transfer gearing moves the generator off the engine axis, which permits placing the traction motor further forward without interference with the generator. The gearing is confined to two gear planes, reducing the transaxle width.

19 Claims, 6 Drawing Sheets

(56) References Cited

U.S. PATENT DOCUMENTS

2015/0224983 A1* 8/2015 Hiasa .................... B60K 6/365
  475/2
2018/0201114 A1 7/2018 Oh et al.

* cited by examiner

FIG. 6B

HYBRID TRANSAXLE

TECHNICAL FIELD

This disclosure relates to the field of vehicle transmissions. More particularly, the disclosure pertains to an arrangement of components in a hybrid transaxle.

BACKGROUND

Hybrid powertrains include energy storage devices such as batteries which are utilized to reduce fuel consumption by capturing braking energy and by permitting more efficient use of an internal combustion engine. The engine may be shut off while the vehicle is stationary. Also, the engine may be operated at higher power settings at which it is typically more efficient and then shut off a portion of the time that the vehicle is moving.

One type of hybrid powertrain is an electric power-split hybrid. At low speed, a planetary gear set divides the mechanical power generated by the internal combustion engine into two power flow paths. A portion of the power is conveyed to the drive wheels by gears, chains, or other mechanical power transfer components. The remaining power is directed to an electric machine and converted into electrical power. This electric machine is typically referred to as a generator although it may also be capable converting electrical power into mechanical power. A second electric machine drives the drive wheels. This second machine is typically referred to as a traction motor although it may be capable of converting mechanical power into electrical power. In some operating modes, all electrical power from the generator flows to the traction motor. In other operating modes, some electrical power may be diverted to a battery. In yet other operating modes, the battery may supplement the electrical power produced by the generator.

In a front wheel drive hybrid transaxle, the engine crankshaft rotates about an axis that is offset from and substantially parallel to an axle axis. The transaxle includes a differential on the axle axis which divides the power between left and right half-shafts that may rotate at slightly different speeds as the vehicle turns a corner. The space available for the transaxle is restricted by the size of the engine compartment and the space occupied by the engine. Even space which may not be occupied by other components may not be available due to considerations of how objects in that space would impact the passenger compartment in a collision.

SUMMARY OF THE DISCLOSURE

A hybrid transaxle includes a planetary gearset, a differential, a countershaft, a generator, and a traction motor. The planetary gearset has a sun, a ring, and a carrier located on a first axis. The differential is located on a second axis below and behind the first axis. The countershaft is driveably connected to the differential and the ring. The countershaft may be located on a fourth axis below the first axis. The generator is driveably connected to the sun. The generator may be located on a fifth axis behind the first axis. The traction motor is driveably connected to the countershaft and is located on a third axis in front of the first axis. An oil pan may be located below the differential and the countershaft. In a first embodiment, the traction motor is driveably connected to the countershaft by a first gear fixedly coupled to the countershaft and meshing with external gear teeth on the ring and a second gear fixedly coupled to the traction motor and meshing with the external gear teeth on the ring. In a second embodiment, the traction motor is driveably connected to the countershaft by a first gear fixedly coupled to the countershaft, a second gear on a sixth axis and meshing with the first gear, and a third gear fixedly coupled to the traction motor and meshing with the second gear. A park gear may be fixedly coupled to the second gear. In a third embodiment, the traction motor is driveably connected to the countershaft by a first gear fixedly coupled to the countershaft, a second gear on a sixth axis and meshing with the first gear, a third gear fixedly coupled to the second gear, and a fourth gear fixedly coupled to the traction motor and meshing with the third gear.

A hybrid transaxle includes a planetary gearset, a differential, a countershaft, and first and second electric machines. The planetary gearset has a sun gear, a ring gear, and a carrier located on a first axis. The differential is located on a second axis below and behind the first axis. The countershaft is driveably connected to the differential and the ring gear and is located on a third axis below the first axis. The first electric machine is driveably connected to the sun gear and is located on a fourth axis behind the first axis. The second electric machine is driveably connected to the countershaft and is located on a fifth axis in front of the first axis. An oil pan may be located below the differential and the countershaft. In a first embodiment, the second electric machine is driveably connected to the countershaft by a first gear fixedly coupled to the countershaft and meshing with external gear teeth on the ring gear and a second gear fixedly coupled to the second electric machine and meshing with the external gear teeth on the ring gear. In a second embodiment, the second electric machine is driveably connected to the countershaft by a first gear fixedly coupled to the countershaft, a second gear on a sixth axis and meshing with the first gear, and a third gear fixedly coupled to the second electric machine and meshing with the second gear. A park gear may be fixedly coupled to the second gear. In a third embodiment, the second electric machine is driveably connected to the countershaft by a first gear fixedly coupled to the countershaft, a second gear on a sixth axis and meshing with the first gear, a third gear fixedly coupled to the second gear, and a fourth gear fixedly coupled to the second electric machine and meshing with the third gear.

A hybrid transaxle includes first and second gear planes. The first gear plane includes a planetary gearset and a first gear. The planetary gearset has a sun gear, a ring gear, and a carrier. The first gear meshes with the ring gear. The second gear plane includes second through fifth gears. The second gear is fixedly coupled to the sun. The third gear meshes with the second gear and is fixedly coupled to a generator. The fourth gear is fixedly coupled to the first gear. The fifth gear meshes with the fourth gear and is fixedly coupled to a differential.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotational speeds to be proportional with a fixed speed ratio. If the power flow path is established in all operating conditions, then the components are fixedly driveably connected. If the power flow path is established only when one or more shift elements are engaged, then the components are selectively driveably connected.

Figure 1:
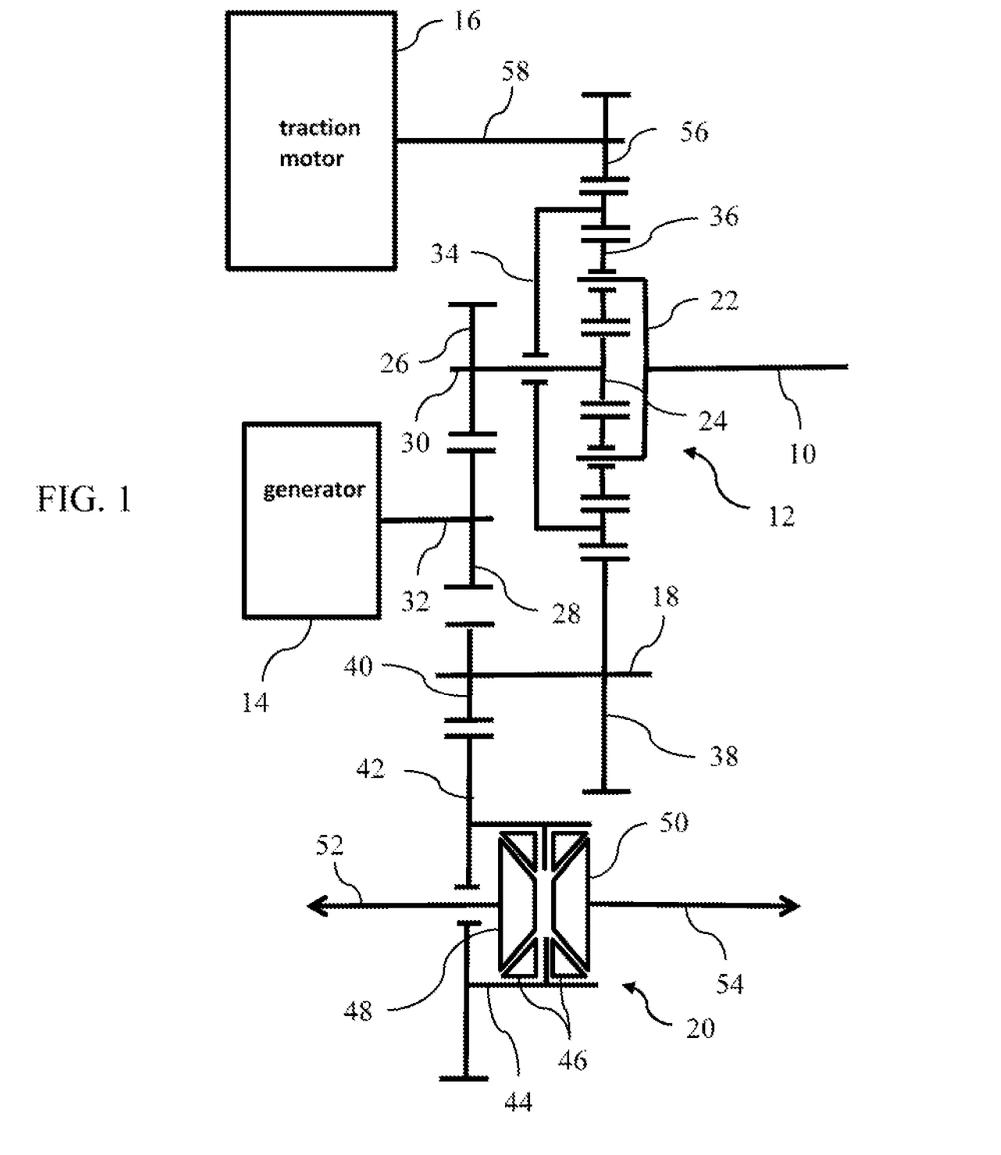
FIG. 1 is a schematic diagram of a five axis power-split hybrid transaxle.
Figure 2A:
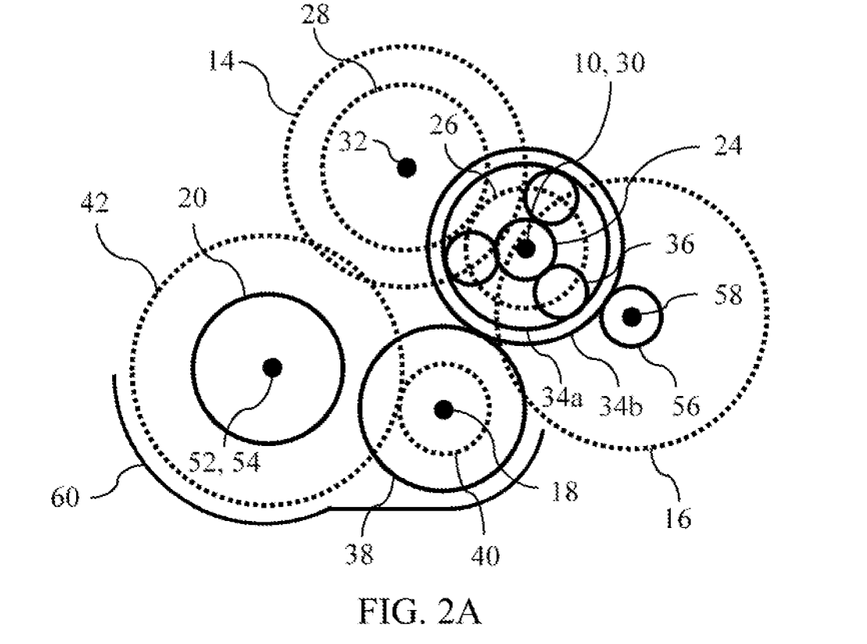
FIGS. 2A and 2B are end-views of the transaxle of FIG. 1.
Figure 2B:
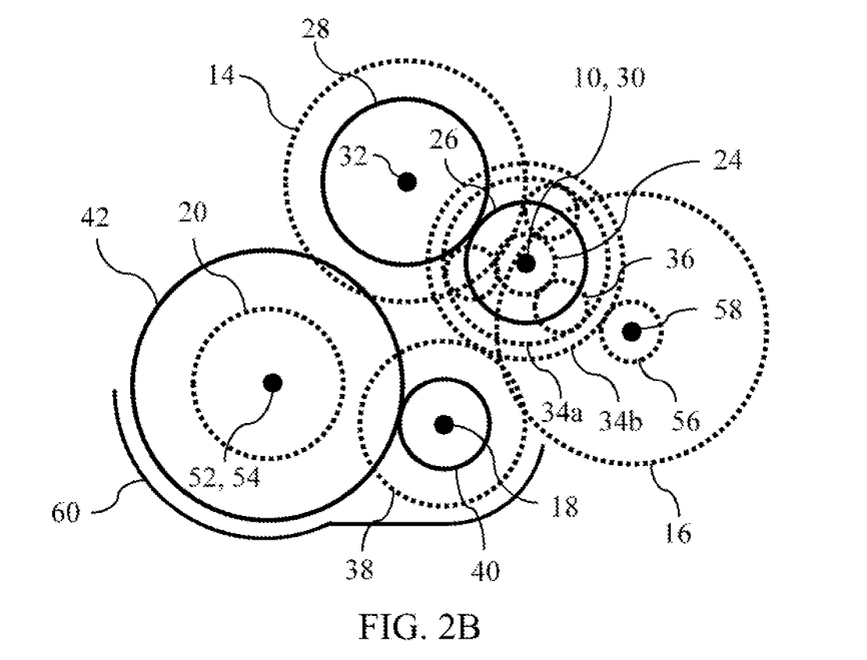

FIGS. 1, 2A, and 2B illustrate a first arrangement for a power-split hybrid transaxle. Power from an internal combustion engine is provides at input shaft 10. At relatively low vehicle speeds, this power is split into two power flow paths by planetary gear set 12. One of the power flow paths is entirely mechanical. In the other power flow path, mechanical power is converted into electrical power by generator 14 and then converted back into mechanical power by traction motor 16. In some operating conditions, some power in this electrical power flow path may be diverted to a battery for later use. In other operating conditions, power from the battery may be added to the electrical power flow path. The power of the two power flow paths is combined at countershaft 18 before being delivered to vehicle wheels via differential 20. Generator 14 and traction motor 16 are both reversible electric machines capable of converting mechanical power into electrical power and vice versa. They may be, for example, synchronous AC motors connected to a DC bus via corresponding inverters. At higher vehicle speeds, power may flow in the opposite direction in the electrical power flow path, establishing a recirculating power condition.

The carrier 22 of planetary gear set 12 is fixedly coupled to input shaft 10. The sun gear 24 is driveably connected to the rotor of generator 14 via gears 26 and 28. Specifically, gear 26 is fixedly coupled to sun gear 24 by shaft 30 and in continuous meshing engagement with gear 28 which is fixedly coupled to the rotor of generator 14 by shaft 32. Alternatively, sun gear 24 could be driveably connected to the rotor of generator 14 by a chain and sprockets. Ring gear 34 has internal gear teeth and external gear teeth. The input shaft 10, gear 28, sun gear 24, carrier 22, and ring gear 34 are all supported for rotation about a first axis. A set of planet gears 36 is supported for rotation with respect to carrier 22 and meshes with sun gear 24 and the internal gear teeth of ring gear 34. The rotor of generator 14 is supported for rotation about a second axis parallel to and offset from the first axis.

Countershaft 18 is supported for rotation about a third axis parallel to and offset from the first and second axes. Two gears, 38 and 40 are fixedly coupled to countershaft 18. Gear 38 meshes with the external gear teeth of ring gear 34. Gears 34 and 38 constitute the mechanical power flow path. Gear 40 meshes with gear 42 which is fixedly coupled to a carrier 44 of the differential 20. A number of beveled planet gears 46 are supported for rotation with respect to differential carrier 44. The beveled planet gears each mesh with both left and right beveled side gears 48 and 50. The left and right side gears 48 and 50 are fixedly coupled to left and right half-shafts 52 and 54, respectively to transfer power to left and right wheels. Gear 42, differential carrier 44, and left and right side gears 48 and 50 are all supported for rotation about a fourth axis parallel to and offset from the first, second, and third axes. Left and right half-shaft 52 and 54 may include universal joints to accommodate slight differences between the fifth axis and the axes of rotation of the left and right wheels.

The rotor of traction motor 16 is supported for rotation about a fifth axis parallel to and offset from the first, second, third, and fourth axes. Gear 56 is fixedly coupled to a rotor shaft 58 of traction motor 16. Gear 56 meshes with the external gear teeth of ring gear 34. Ring gear 34 acts as an idler gear to transfer power from gear 56 to gear 38 on countershaft 18. Gear 38 is larger in diameter than gear 42 providing torque multiplication. The electrical power flow path includes gear 26, gear 28, generator 14, traction motor 16, gear 56, gear 34, and gear 38.

Note that all of the gearing is located in two gear planes. Gears 56 and 18, planetary gear set 12, and differential 20 are located in a first gear plane. Gears 26, 28, 40, and 42 are located in a second gear plane. A low number of gear planes allows for a thin gearbox, leaving more axial space for electric machines 14 and 18.

FIGS. 2A and 2B show the relative location of the five axes. For clarity, elements on the first gear plane are shown with solid lines in FIG. 2A while elements on the second gear plane are shown with solid lines in FIG. 2B. In these figures, the internal gear teeth of ring gear 34 are designated 34a and the exterior gear teeth of ring gear 34 are designated 34b.

In general, it is advantageous to have a transaxle that is compact in both the radial direction and the axial direction. However, the relative locations of the various axes must satisfy a number of constraints. The relative locations of the first and fourth axes are dictated by the relative locations of the engine and front wheels within the vehicle. Placing the generator and the traction motor side by side at the same axial position reduces the axial length of the transaxle. In order to place them side by side, the separation between the second axis and the fifth axis must be sufficient. Traction motor 16 is typically larger than generator 14 due to relative power and torque requirements. Simulations of vehicle crash scenarios has indicated that positioning the traction motor forward of the engine axis reduces the risk of occupant injury in an accident. The generator, being smaller, poses less risk to occupants in an accident. Locating the fourth (countershaft) axis low enables positioning the generator relatively low.

FIGS. 2A and 2B also show oil pan 60. A fluid, such as automatic transmission fluid, is distributed to the gears and electric machines to provide lubrication and cooling. The fluid drains by gravity into oil pan 60 which is located at the lowest point of the transmission case.

Figure 3:
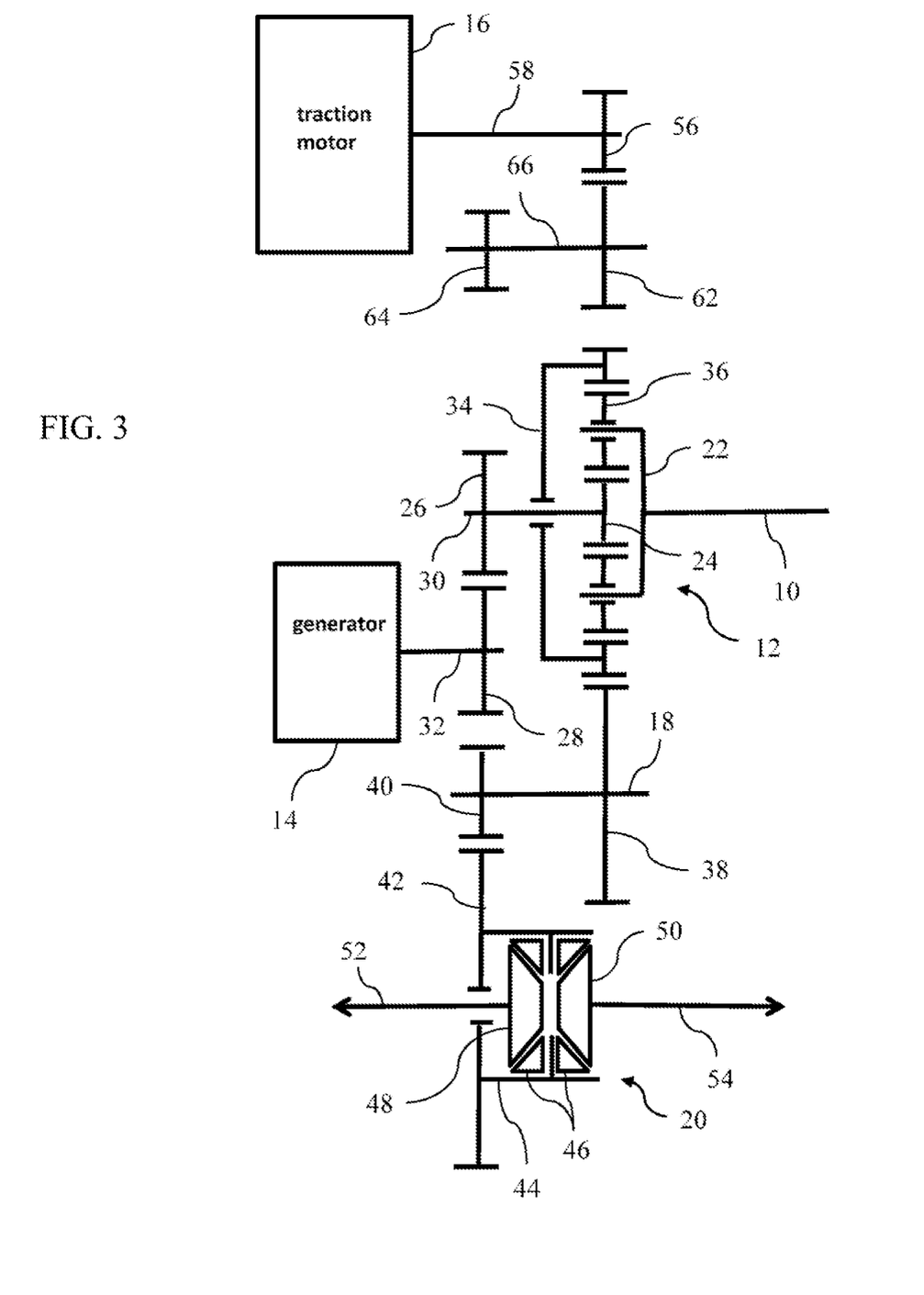
FIG. 3 is a schematic diagram of a first sex axis power-split hybrid transaxle.
Figure 4A:
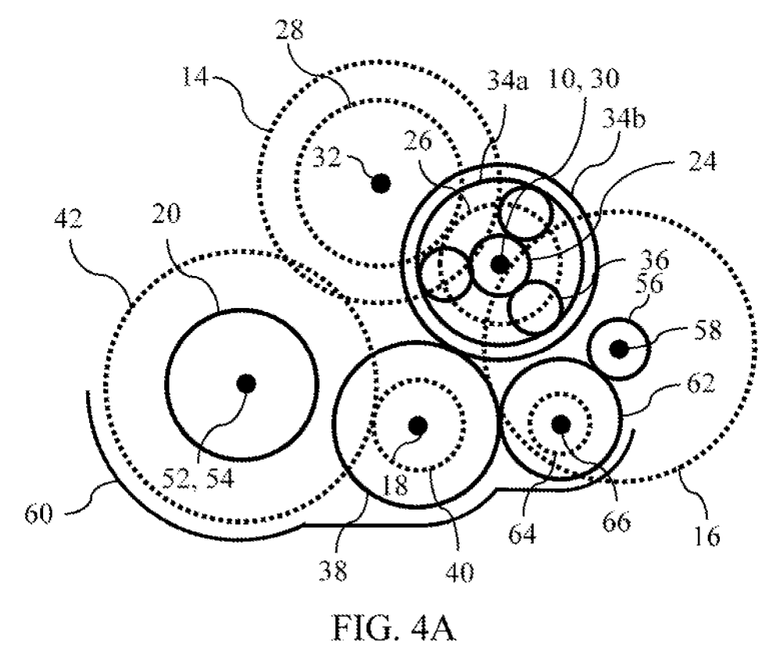
FIGS. 4A and 4B are end-views of the transaxle of FIG. 3.
Figure 4B:
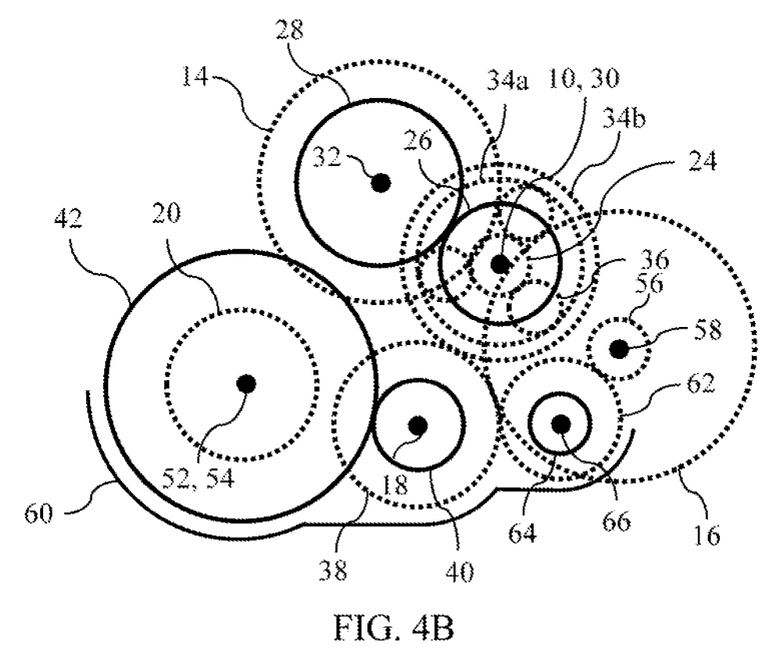

FIGS. 3, 4A, and 4B illustrate a second powersplit hybrid arrangement. In this arrangement gear 56 does not mesh with the external gear teeth of ring gear 34. Instead, a dedicated idler gear 62 is provided on a sixth axis. Idler gear 62 meshes with gear 56 and with gear 38. The dedicated idler gear permits traction motor 16 to be located further forward. Moving traction motor 16 further forward increases the distance between the second axis and the fifth axis, allowing one or both of the electric machines to have a larger diameter. Larger diameter electric machines may be capable of generating more torque and/or may be shorter in the axial direction. Park gear 64 is fixedly coupled to idle gear 62 via shaft 66.

Figure 5:
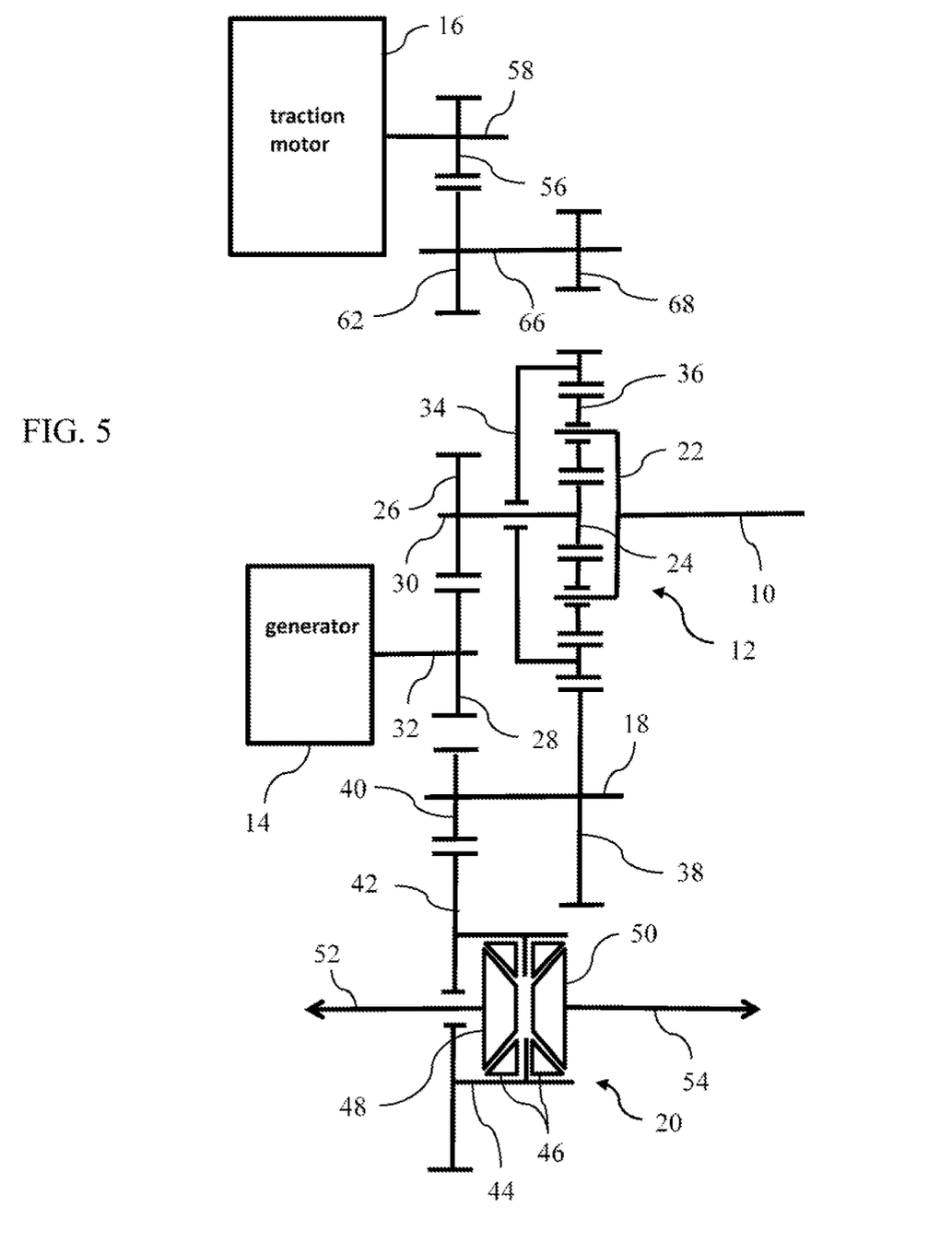
FIG. 5 is a schematic diagram of a second six axis power-split hybrid transaxle.
Figure 6A:
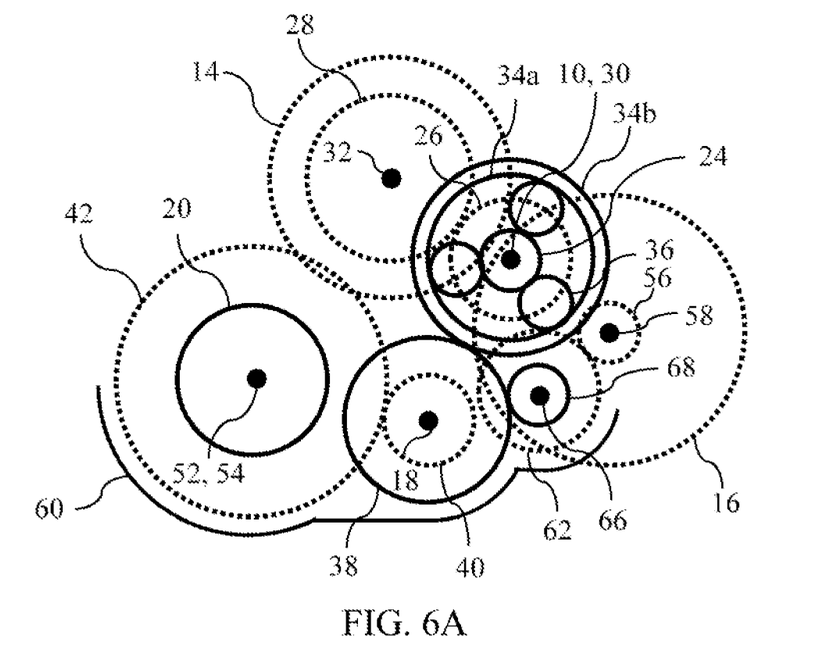
FIGS. 6A and 6B are end-views of the transaxle of FIG. 5.
Figure 6B:
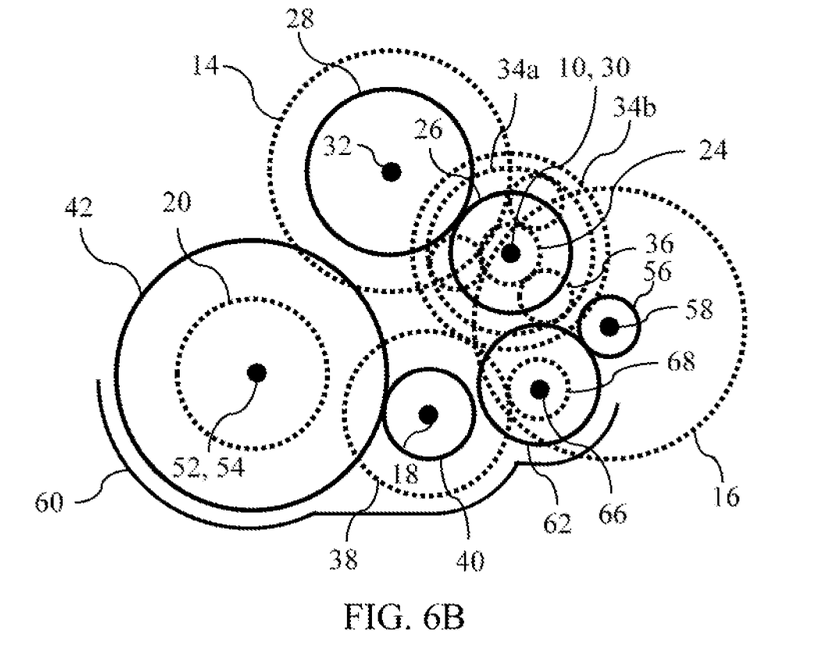

FIGS. 5, 6A, and 6B illustrate a third powersplit hybrid embodiment. In this arrangement, gears 56 and 62 are located in the second gear plane and gear 62 does not mesh with countershaft gear 38. Gear 62 is fixedly coupled to gear 68 by shaft 66. Gear 68 meshes with countershaft gear 38. Gear 68 has a smaller pitch diameter than gear 62, providing speed reduction and torque multiplication in the power flow path from traction motor 16 to the countershaft. This additional gear ratio permits traction motor 16 to be smaller in diameter for a given vehicle torque requirement or permits the transmission to satisfy a higher vehicle torque requirement with a given motor diameter.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A hybrid transaxle comprising:
   a planetary gearset having a sun, a ring, and a carrier located on a first axis;
   a differential located on a second axis below and behind the first axis;
   a countershaft driveably connected to the differential and the ring;
   a generator driveably connected to the sun, wherein the generator is located on a third axis behind the first axis; and
   a traction motor driveably connected to the countershaft and located on a third fourth axis in front of the first axis.

2. The hybrid transaxle of claim 1 wherein the countershaft is located on a fifth axis below the first axis.

3. The hybrid transaxle of claim 1 further comprising an oil pan located below the differential and the countershaft.

4. The hybrid transaxle of claim 1 wherein the traction motor is driveably connected to the countershaft by a first gear fixedly coupled to the countershaft and meshing with external gear teeth on the ring and a second gear fixedly coupled to the traction motor and meshing with the external gear teeth on the ring.

5. The hybrid transaxle of claim 1 wherein the traction motor is driveably connected to the countershaft by a first gear fixedly coupled to the countershaft, a second gear on a sixth axis and meshing with the first gear, and a third gear fixedly coupled to the traction motor and meshing with the second gear.

6. The hybrid transaxle of claim 5 further comprising a park gear fixedly coupled to the second gear.

7. The hybrid transaxle of claim 1 wherein the traction motor is driveably connected to the countershaft by a first gear fixedly coupled to the countershaft, a second gear on a sixth axis and meshing with the first gear, a third gear fixedly coupled to the second gear, and a fourth gear fixedly coupled to the traction motor and meshing with the third gear.

8. A hybrid transaxle comprising:
   a planetary gearset having a sun gear, a ring gear, and a carrier located on a first axis;
   a differential located on a second axis below and behind the first axis;
   a countershaft driveably connected to the differential and the ring gear and located on a third axis below the first axis;
   a first electric machine driveably connected to the sun gear and located on a fourth axis behind the first axis; and
   a second electric machine driveably connected to the countershaft and located on a fifth axis in front of the first axis.

9. The hybrid transaxle of claim 8 further comprising an oil pan located below the differential and the countershaft.

10. The hybrid transaxle of claim 8 wherein the second electric machine is driveably connected to the countershaft by a first gear fixedly coupled to the countershaft and meshing with external gear teeth on the ring gear and a second gear fixedly coupled to the second electric machine and meshing with the external gear teeth on the ring gear.

11. The hybrid transaxle of claim 8 wherein the second electric machine is driveably connected to the countershaft by a first gear fixedly coupled to the countershaft, a second gear on a sixth axis and meshing with the first gear, and a third gear fixedly coupled to the second electric machine and meshing with the second gear.

12. The hybrid transaxle of claim 11 further comprising a park gear fixedly coupled to the second gear.

13. The hybrid transaxle of claim 8 wherein the second electric machine is driveably connected to the countershaft by a first gear fixedly coupled to the countershaft, a second gear on a sixth axis and meshing with the first gear, a third gear fixedly coupled to the second gear, and a fourth gear fixedly coupled to the second electric machine and meshing with the third gear.

14. A hybrid transaxle comprising:
a first plane of gears including
   a planetary gearset having a sun gear, a ring gear, and a carrier, and
   a first gear meshing with the ring gear; and
a second plane of gears including
   a second gear fixedly coupled to the sun gear,
   a third gear meshing with the second gear and fixedly coupled to a generator,
   a fourth gear fixedly coupled to the first gear, and
   a fifth gear meshing with the fourth gear and fixedly coupled to a differential.

15. The hybrid transaxle of claim 14 wherein the first plane of gears further includes a sixth gear meshing with the ring gear and fixedly coupled to a traction motor.

16. The hybrid transaxle of claim 15 wherein:
the planetary gearset and the second gear are located on a first axis;
the differential and the fifth gear are located on a second axis below and behind the first axis;
the first gear and the fourth gear are located on a third axis below the first axis;
the generator and the third gear are located on a fourth axis behind the first axis; and
the traction motor and sixth gear are located on a fifth axis in front of the first axis.

17. The hybrid transaxle of claim 14 wherein the first plane of gears further includes a sixth gear fixedly coupled to a traction motor and a seventh gear meshing with the sixth gear and the first gear.

18. The hybrid transaxle of claim 17 wherein:
the planetary gearset and the second gear are located on a first axis;
the differential and the fifth gear are located on a second axis below and behind the first axis;
the first gear and the fourth gear are located on a third axis below the first axis;
the generator and the third gear are located on a fourth axis behind the first axis;
the traction motor and sixth gear are located on a fifth axis in front of the first axis; and
the seventh gear is located on a sixth axis.

19. The hybrid transaxle of claim 18 wherein the second plane of gears further includes a park gear fixedly coupled to the seventh gear.

* * * * *